Oct. 8, 1957   J. R. HALL   2,808,696
COUNTERBALANCED DRIVE MECHANISM FOR HARVESTER SICKLES
Filed Oct. 26, 1954
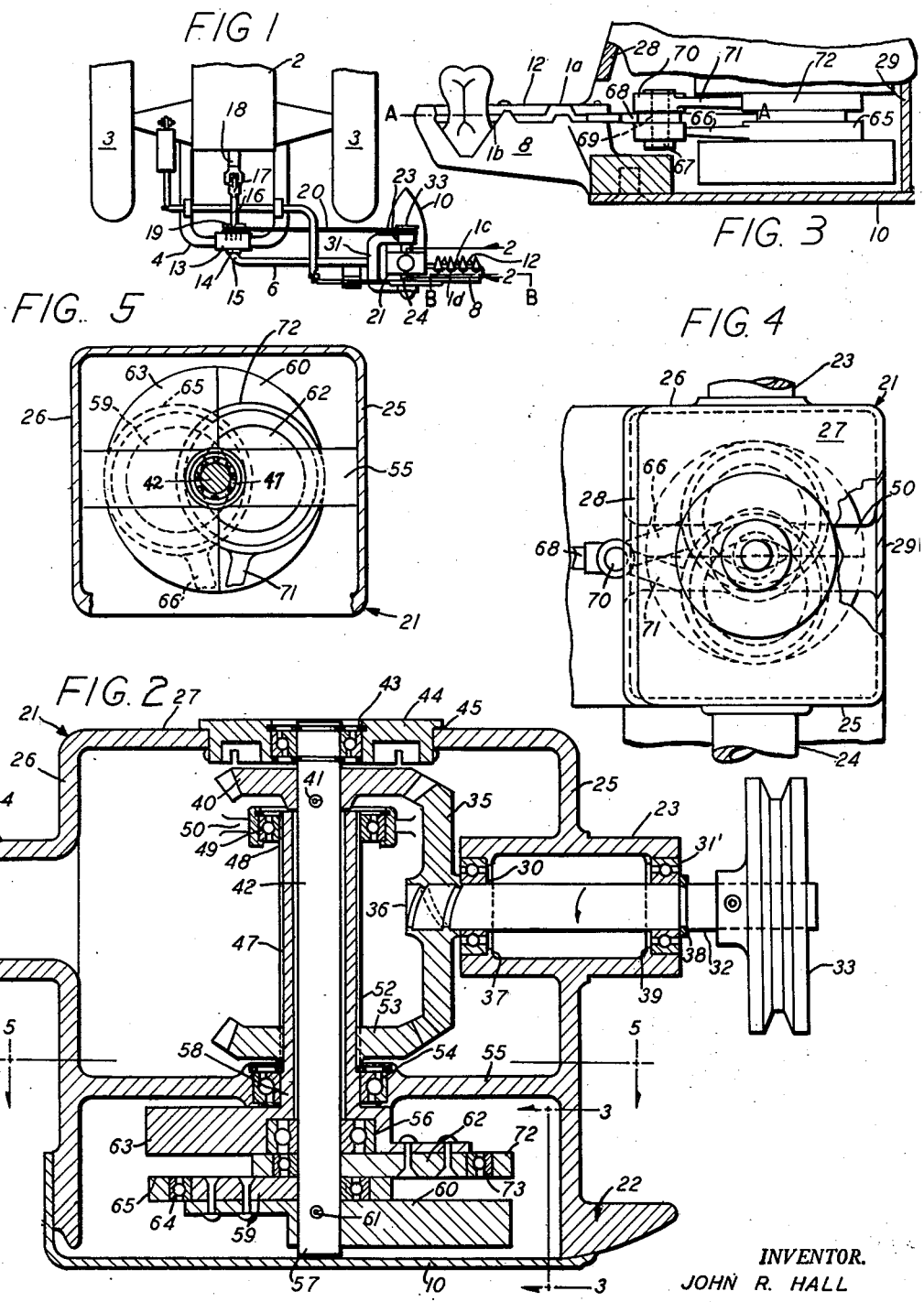
INVENTOR.
JOHN R. HALL
BY Paul O. Pippel
ATTORNEY United States Patent Office 2,808,696
Patented Oct. 8, 1957

2,808,696
COUNTERBALANCED DRIVE MECHANISM FOR HARVESTER SICKLES

John R. Hall, Chicago, Ill., assignor to International Harvester Company, a corporation of New Jersey Application October 26, 1954, Serial No. 464,673

6 Claims. (Cl. 56—296)

This invention relates to a drive mechanism for the sickles of harvesters and more specifically to an improved mechanism incorporating means for counterbalancing the inertia forces of the sickle at each end of its stroke.

In crop harvesters of the type which operate cutterbars, such as grain combines or harvesters, windrowers and mowers the reciprocating sickle creates a serious vibration problem which is accentuated by attempts to drive the sickle at ever-increasing speeds in order to speed up harvesting to reduce unit cost. In machines such as combines which possess a great mass, the vibration problem is not as serious as it is in mowers which are extremely light-weight units connected directly to the tractor. Heretofore, in view of the slower speeds at which these units were operated and also because of the excessive weight which was built into such mowers, the mowers have had a reasonable life expectancy. In order to stay with competition, the design of the mower has had to be continuously revamped in order to reduce production costs and the weight reductions affected have further aggravated the vibration problem. Off hand it would appear to be simple to apply counterbalancing principles to counteract unbalanced inertia forces, however, particularly in mowers consideration must be had to factors such as cost, adaptability of the new construction for use in conventional implements as close as possible, simplicity, result, efficiency, etc. In the short stroke high speed reciprocation of the mower, the problem of counterbalancing the inertia forces is entirely different from the case of counterbalancing crankshafts, for example, of internal combustion engines wherein a cushioning resistance is provided in the piston stroke whereas there is a comparative lack of resistance to the reciprocation of the sickle by the crop material being cut.

It is a general object of the invention to balance the inertia forces of a reciprocating sickle in a harvester by rotary counter-weights.

It is a more specific object of the invention to utilize existing sickle drive principles with the novel counterweight arrangement as closely as possible so that the instant drive mechanism is readily adaptable for use in conventional mower designs.

A further object of the invention is to utilize a coaxial counter-rotating input member which includes eccentrics incorporating counter-weights, the eccentrics being each connected through a drive transmitting member to the sickle.

A still further object of the invention is to design the sickle drive in such manner that the counterweights operate in planes generally parallel to the sickle and the axis of rotation of the eccentrics being disposed in substantially the vertical longitudinal medial plane of the sickle.

These and other objects of the invention will become more apparent from the specification and drawings, wherein:

Figure 1 is a fragmentary plan view of the representative tractor-mower construction embodying the improved drive unit;

Figure 2 is a transverse vertical sectional view of the drive mechanism taken substantially on the line 2—2 of Figure 1 on an enlarged scale;

Figure 3 is a fragmentary vertical sectional view taken substantially on the line 3—3 of Figure 2;

Figure 4 is a fragmentary plan view of the driving mechanism on a different scale than Figure 2, and Figure 5 is a reduced horizontal sectional view taken substantially on the line 5—5 of Figure 2 drawn substantially in the scale of Figure 4.

As hereinbefore stated, the principles of the invention apply to harvesters in general.

Inasmuch as the preferred embodiment herein disclosed was designed principally for a mower, and with a view toward clarity and brevity in the description, reference will be had to harvester structure as exemplified by the mower.

The structure chosen for illustration and description comprises a mower of the tractor-mounted type, wherein a tractor having a longitudinal body 2 carried between rear traction wheels 3 has a rearwardly extending U-shaped draw-bar 4 which provides supporting structure for mounting of a mower comprising a support in the form of a coupling bar 6 on which is mounted cutting mechanism including a cutter bar 8, an inner shoe 10 and a reciprocating sickle 12 which has top and bottom or opposite sides 1a and 1b and cutting and back edges 1c and 1d.

The intermediate portion of the rear of the draw-bar 4 carries a casing 13 which provides a bearing 14 for the forwardly bent end 15 of the coupling bar 6 for swinging about a fore and aft extending axis. The casing or standard 13 journals a forwardly extending input shaft 16, connected by universal joints 17 to a power take-off drive shaft 18 of the tractor. The shaft 16 is provided with a pulley or sheave 19 which drives a belt 20.

The structure described thus far describes the generally conventional design and may be constructed in any desirable manner, inasmuch as it forms no part of the present invention.

The improved drive mechanism is supported or contained within a carrier or housing 21 having base means 22 providing for mounting thereof or the affixation thereof to the upper rear portion of the inner shoe 10. Any familiar mounting means may be provided and in the present instance, the casing 21 is preferably fixed as by welding to the inner shoe 10 generally in line with the line of reciprocation of the sickle 12. The housing is provided with a pair of coaxially spaced bearing elements 23 and 24 on generally parallel front and rear walls 25 and 26 which are inter-connected by a substantial horizontal top wall 27 and lateral outboard and inboard walls 28 and 29. The axis of the bearings or trunnions, the axis of which is transverse to the line of reciprocation of the sickle 12, and these trunnions effected by the external sides of the bearing members or holders 23 and 24 provide means via which the housing or carrier is pivotally connected on a fore and aft axis to a yoke 31 forming part of the coupler member 6.

The member 23 is hollow and supports a pair of axially spaced rotary bearings 30 and 31' which provide means for journalling or otherwise movably supporting an input member in the form of a rotary shaft 32 having at its outer end a sheave or pulley 33 which is in alignment with the sheave 19 as best seen in Figure 1 and drivingly interconnected therewith by means of the aforesaid belt 20. Inasmuch as the axis of the input shaft 32 is coincident with the axis of the trunnions 23 and 24, the tightness of the belt between the sheaves 19 and 33 will not be affected by changes in angle between the cutter bar 8 and the arm 6. Furthermore, inasmuch as the bearing 14 is coaxial with the shaft 16, the tightness of the belt will be unaffected by changes in the position of the bar 6 relative to the support member 13. It will be appreciated that the specific mounting of the mower on the tractor may be varied and forms no part of the invention and that the shaft and pulley 32, 33 may be mounted to extend to the rear of the housing without affecting the invention.

The inner end of the input shaft 32 is connected to a bevel gear 35 and this connection, for assembly purposes may be in the form of a lefthand thread on the gear 35 and the inner end 36 of the input shaft and the lefthand thread is so arranged as to provide a driving connection between the shaft 32 which is adapted to be rotated in a clockwise direction and at the same time draw the gear 35 against the inner bearing 30 for holding it against the shoulder 37 of the cylindrical trunnion member 23 and at the same time drawing the locking ring 38 on the shaft against the outer bearing 31 which is caused to seat against the shoulder 39 at the outer end of the forward bearing shoulder 23. The bevel gear 35 meshes at its upper side or edge with a companion bevel gear 40 which is keyed as by pin 41, which may preferably be of the so-called rolled pin-type which is of C-shape resilient construction, to a vertical shaft 42 which at its upper end is rotatably supported by a bearing assembly 43 from a cap 44 which is snapped into an appropriate aperture 45 of the top wall 27 and for all intents and purposes it may be said that the shaft 42 is carried from the top wall 27. The shaft 42 is telescoped within a counter-rotating hollow tubular shaft 47 which has an upper end 48 piloted within a bearing 49 which is carried by a transverse brace element 50 (Figure 4) which inter-connects and is integrally joined with the inboard and outboard lateral walls 29 and 28 at their upper portions. The shaft 47 has a splined connection 52 with a miter of bevel gear 53 which meshes with the lower edge portion of the input bevel gear 35 at a point substantially diametrically opposite to that whereat the upper gear 40 meshes with the gear 35. Thus it will be seen that the gears 40 and 53 and the shafts 42 and 47 to which the respective gears are connected are caused to rotate in opposite directions attendant to rotation of the input shaft 32 as indicated.

The outer shaft 47 is supported on a bearing structure or assembly 54 which is carried by a transverse support brace or element 55 which extends between and integrally inter-connects with the lower portions of the front and rear walls 25 and 26 of the casing as best seen in Figure 5. The lower end of the outer shaft 47 projects below the element 55 and is provided with a pilot bearing 56 which journals the lower portion 57 of the inner shaft 42, which lower portion projects below the lower end 58 of the outer shaft and thereat mounts a crank element or eccentric 59 which is connected to a counter-weight 60, the eccentric 59 and the counter-weight 60 being disposed at diametrically opposite sides of the axis of rotation of the shaft assemblies 42 and 47 and connected to shaft 42 by a pin 61. Similarly the lower end 58 of the shaft 47 is connected to an eccentric or crank element 62 which is disposed diametrically opposite to a counter-weight member 63 in the present instance formed integral with the lower portion 58 of the shaft 47.

It will be seen from the consideration of Figures 2 and 3 that the eccentrics 59 and 62 are disposed in adjacent relationship and that the upper eccentric 62 is positioned immediately above a given plane of reciprocation of the knife 12 as essentially indicated by line A—A of Figure 3 and that the eccentric 59 is positioned immediately below the plane of reciprocation of the knife 12. The eccentric 59 is provided with a bearing 64 herein indicated as being press-fitted on the eccentric 59 and the outer race of bearing 64 is surrounded by a hub 65, press-fitted thereon, of a pitman or connecting rod 66 (Figure 3) which at its outer end is pivotally connected by means of a pin 67 on a substantially vertical axis substantially parallel to the axis of the shafts 42 and 47 and in alignment therewith in a substantially vertical transverse plane of the longitudinal median line of reciprocation of the sickle as essentially indicated by line B—B of Figure 1. The pin 67 pivots on the inner end 68 of the knife as at 69 (Fig. 3). The pin 67 extends above the knife and journals or provides a pivotal connection for the outer end 70 of the pitman or connecting rod 71 to the knife. The inner end or rod 71 is provided with a hub 72 which is shown as being pressed onto a bearing 73 which is similarly pressed on the eccentric 62. It will be appreciated that bearing connections 64 and 73 may be of any form desired and the inter-locks may be of any suitable means.

It will be appreciated that the two pitmans 66 and 71 have their outer ends pivotally connected to the knife 12 on a common axis or at a common point and that the two shafts 47 and 42 are so phased to dispose the counter-weight 63 and 60 in directly opposed relation to the direction of the stroke of the sickle at each end of its stroke so that additively the two counter-weights 60 and 63 provide a dynamic or inertia balancing couple with respect to the mass of the knife whereby neutralizing these forces. It will be appreciated that at each end of each stroke of the knife, the knife, the pitmans and the counter-weights will be aligned longitudinally of the knife and it will be further appreciated that by disposing the two counter-weights so that they operate in planes parallel to the plane of the knife and immediately adjacent to the plane, that vertical unbalance is, for all practical considerations, eliminated and that the resultant opposing forces are substantially coplanar.

Furthermore, it will be observed that the arrangement is simple and is adaptable to conventional mower designs and possess the efficiency and the simplicity desired.

What is claimed is:

1. For a harvester having a support and a cutter bar including a sickle reciprocable thereon on a given line in a given plane; sickle drive means comprising a hollow housing having bearing means, said housing having means thereon for connection to said cutter bar in position whereby said bearing means are disposed on an axis transverse to said line of reciprocation of the sickle, said housing further having external means providing for connection of the housing to the support; an input shaft extending through and journalled in said bearing means and having an inner end within the housing; a bevel gear connected to the inner end of said shaft; inner and outer coaxial output shafts within the housing; means mounting said output shafts within the housing for rotation on an axis in a plane normal to the axis of said input shaft and perpendicular to said plane of reciprocation of the sickle; bevel gears drivingly connected to respective inner and outer shafts and in meshing engagement with said bevel gear at diametrically opposite sides thereof whereby said output shafts are driven counter-rotationally from said bevel gear; eccentrics connected to said output shafts and positioned respectively at opposite sides of said plane; a counterweight connected to each shaft diametrically opposite to the associated eccentric; and a pair of drive transmitting members having outer ends; means pivotally interconnecting said outer ends and adapted for pivotal connection to said sickle; said members having inner ends operatively connected to the eccentrics of respective output shafts.

2. Sickle drive mechanism, comprising a carrier having means for the mounting thereof on an associated supporting structure; an elongated, substantially flat sickle reciprocal in a given plane and having a cutting edge and a back edge and opposite sides; coaxial rotary members journaled on the carrier for rotation on an axis disposed in a plane extending transversely of said given plane and medially between said edges; said rotary members including crank means disposed respectively at opposite sides of the sickle; individual drive means connected to respective crank means and disposed at respective sides of the sickle and interconnected at a common point to said sickle;

and counterweight means connected to respective rotary members for rotation therewith and so located and proportioned that the intertia forces of the sickle and said counterweight are substantially balanced.

3. Drive mechanism for a sickle reciprocal in a given plane on an associated cutter bar, a carrier having means thereon for the mounting thereof on the associated cutter bar; driving means including a pair of coaxial rotary elements journaled in the carrier on an axis in transverse alignment with said sickle longitudinally thereof; crank means on said elements proximate one end of the sickle; individual drive means connected to each crank means and connected with said one end of said sickle; and counterweight means connected to respective rotary elements for rotation therewith in phased relation to the reciprocation of the sickle to provide a balanced inertia couple therewith; and said counterweight means disposed at opposite sides of said plane of reciprocation of the sickle and operating generally parallel to and immediately adjacent to said sickle.

4. Sickle drive means comprising a carrier having means thereon for affixation to an associated cutter bar; an elongated sickle reciprocal in a given plane and having a cutting edge and a back edge; a pair of telescoped shafts journalled on the carrier for rotation on an axis extending transversely of said plane and between said edges; a crank on each shaft; means operatively associated with said shafts for counterrotating said shafts; a pitman connected to each crank at one end; means interconnecting said pitmans to each other at their other ends and to the sickle; and a counterweight connected to each shaft diametrically opposite the crank for rotation therewith.

5. The invention according to claim 4 and further characterized in that said counterweight, pitman and crank of one shaft is disposed at one side of said plane and said counterweight, pitman and crank of said other shaft are disposed at the opposite side of the said plane.

6. The invention according to claim 4 and said counterweights disposed at opposite sides of said plane in close proximity thereto and operable in planes generally parallel to said plane.

References Cited in the file of this patent

UNITED STATES PATENTS

| | | |
|---|---|---|
| 2,345,383 | Curtis | Mar. 28, 1944 |
| 2,428,924 | Albertson | Oct. 14, 1947 |
| 2,496,608 | Thomas | Feb. 7, 1950 |
| 2,616,234 | Love | Nov. 4, 1952 |
| 2,686,998 | Miller et al. | Aug. 24, 1954 |